United States Patent [19]

Chua et al.

[11] Patent Number: 5,140,670
[45] Date of Patent: Aug. 18, 1992

[54] CELLULAR NEURAL NETWORK

[75] Inventors: Leon O. Chua, Berkeley; Lin Yang, Albany, both of Calif.

[73] Assignee: Regents of The University of California, Oakland, Calif.

[21] Appl. No.: 417,728

[22] Filed: Oct. 5, 1989

[51] Int. Cl.$^5$ .............................................. G06F 15/00
[52] U.S. Cl. ....................................... 395/24; 395/22
[58] Field of Search ................. 364/513, 900; 395/24, 395/22

[56] References Cited

U.S. PATENT DOCUMENTS

| | | | |
|---|---|---|---|
| 4,644,496 | 2/1987 | Andrews | 364/900 |
| 4,660,166 | 4/1987 | Hopfield | 364/807 |
| 4,796,199 | 1/1989 | Hammerstrom et al. | 364/513 |
| 4,941,122 | 7/1990 | Weideman | 364/807 |
| 5,001,631 | 3/1991 | Castelaz | 364/402 |

OTHER PUBLICATIONS

Caudill, M., "Neural Networks Primer Part VI", AI Expert, Feb. 1989, pp. 61–67.
Mead, C., Analog VLSI and Neural Systems, Addison-Wesley Pub., 1989, pp. 257–278.
Chau et al., "Cellular Neural Networks: Theory", IEEE Trans. Circuits and Systems, vol. 35(10) Oct. 1988, pp. 1257–1272.
Chau et al., "Cellular Neural Networks: Applications," IEEE Trans-Circuits and Systems, vol. 35(10) Oct. 1988, pp. 1273–1290.
Cortes et al., "A Network System for Image Segmentation", IJCNN, Jun. 18–22, 1989, pp. I-121-125.
Bailey et al., "Why VLSI Implementations of Associative VLCNs Require Connection Multiplexing", IEEE 2nd Intl. Conf. on Neural Networks, 1988, II-173-180.
Carpenter, G. A., "Neural Network Models for Pattern Recognition and Associative Memory", Neural Networks vol. 2, 1989 pp. 243–257.

*Primary Examiner*—Michael R. Fleming
*Assistant Examiner*—Robert W. Downs
*Attorney, Agent, or Firm*—Owen, Wickersham & Erickson

[57] ABSTRACT

A novel class of information-processing systems called a cellular neural network is discussed. Like a neural network, it is a large-scale nonlinear analog circuit which processes signals in real time. Like cellular automata, it is made of a massive aggregate of regularly spaced circuit clones, called cells, which communicate with each other directly only through its nearest neighbors. Each cell is made of a linear capacitor, a nonlinear voltage-controlled current source, and a few resistive linear circuit elements. Cellular neural networks share the best features of both worlds; its continuous time feature allows real-time signal processing found within the digital domain and its local interconnection feature makes it tailor made for VLSI implementation. Cellular neural networks are uniquely suited for high-speed parallel signal processing.

18 Claims, 7 Drawing Sheets

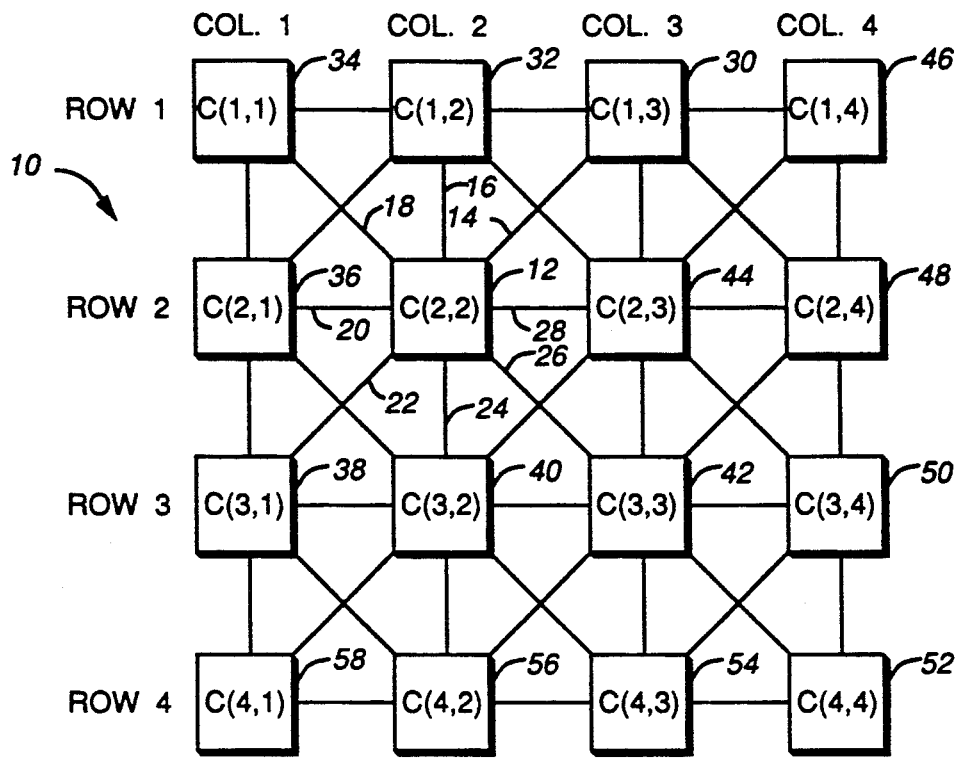
FIG._1
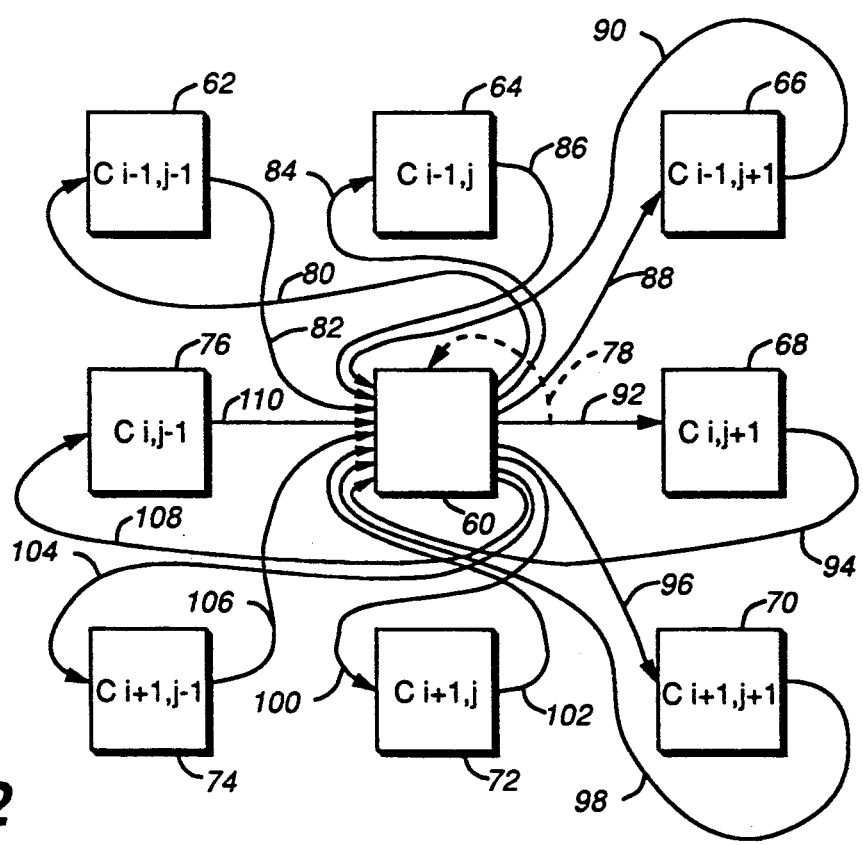
FIG._2

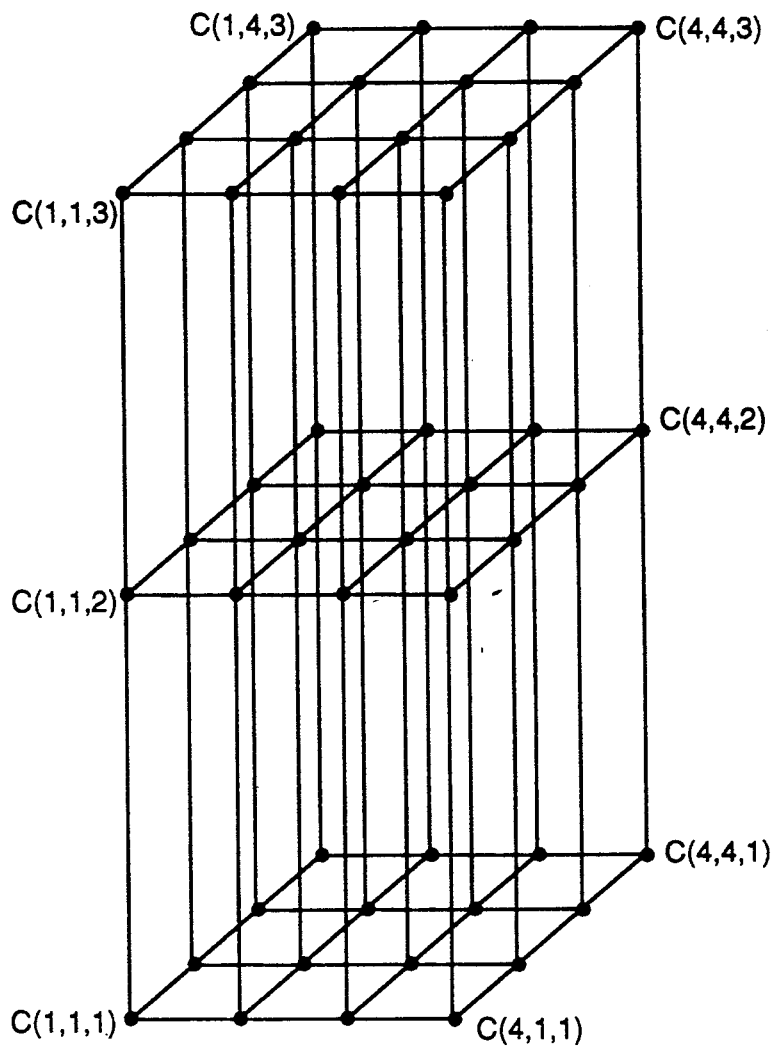
FIG._3
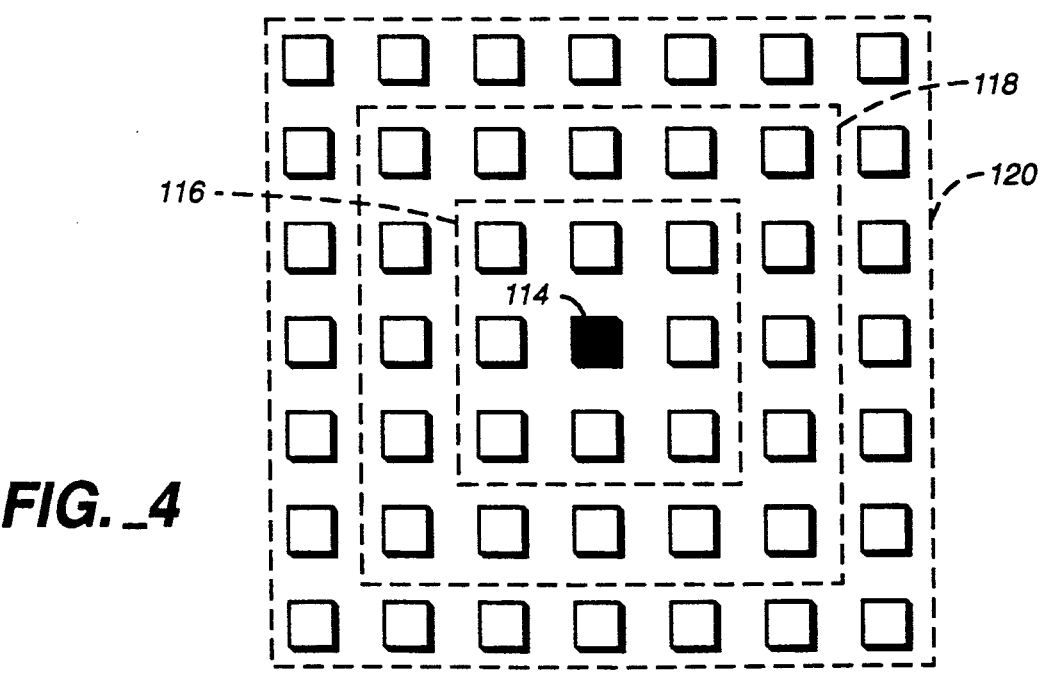
FIG._4

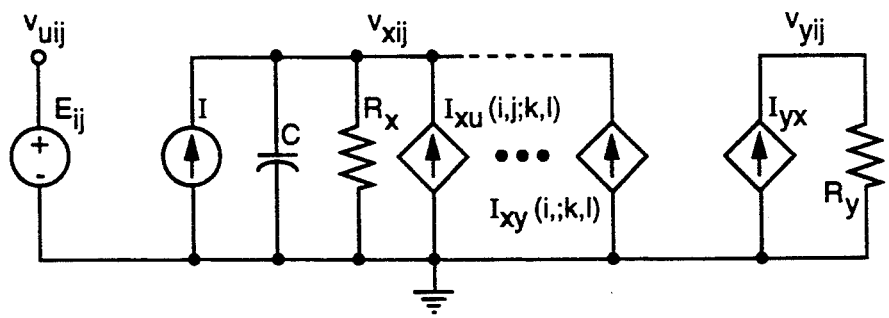
FIG._5A
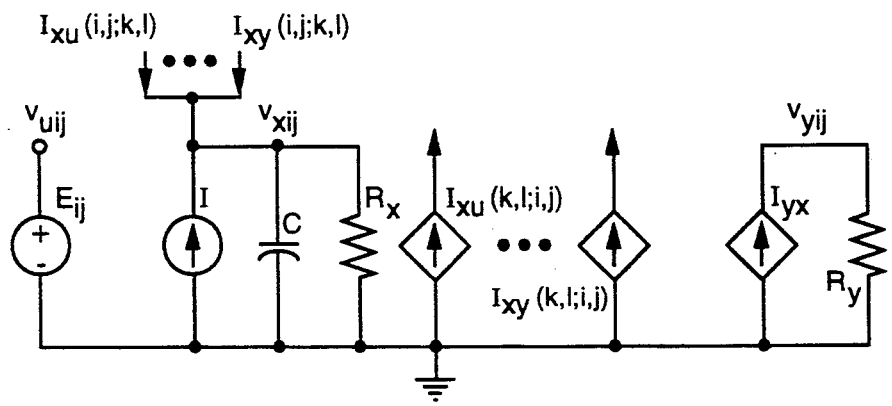
FIG._5B
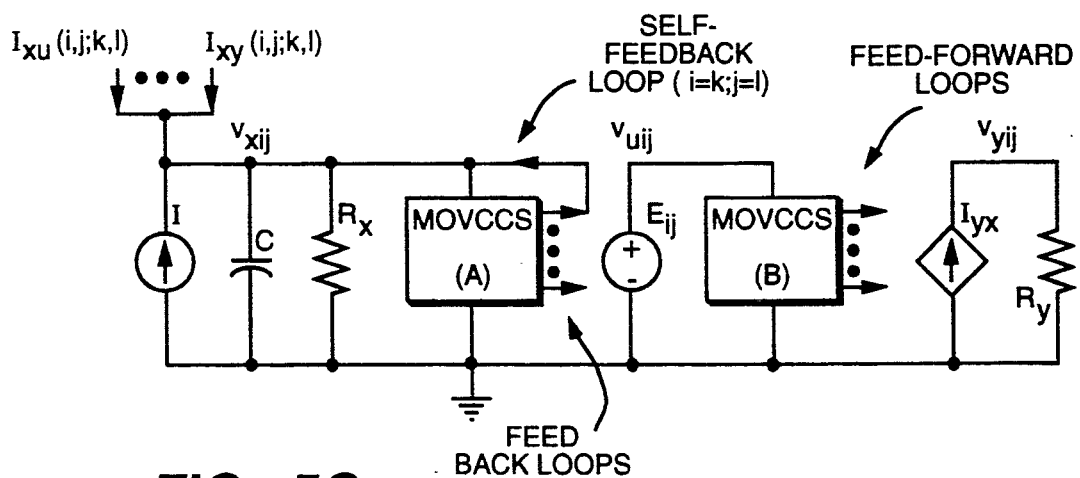
FIG._5C

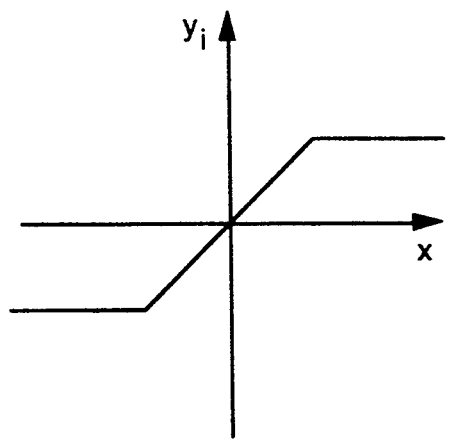
FIG._6A
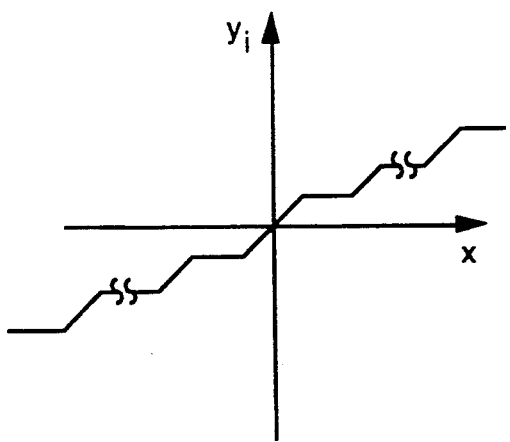
FIG._6B
| -.08 | 1.0 | -1.0 | -0.6 |
|---|---|---|---|
| 1.0 | 1.0 | 1.0 | -0.6 |
| -1.0 | -0.9 | -1.0 | -0.8 |
| -0.9 | -1.0 | -0.7 | -0.8 |
FIG._7A
| 3.95 | 2.98 | -2.97 | -3.98 |
|---|---|---|---|
| 2.98 | 2.02 | -3.94 | -4.96 |
| -2.98 | -3.94 | -5.94 | -4.97 |
| -3.98 | -4.96 | -4.97 | -3.98 |
FIG._7B
| 1.0 | 1.0 | -1.0 | -1.0 |
|---|---|---|---|
| 1.0 | 1.0 | -1.0 | -1.0 |
| -1.0 | -1.0 | -1.0 | -1.0 |
| -1.0 | -1.0 | -1.0 | -1.0 |
FIG._7C
| -1.0 | 0.4 | -0.8 | -1.0 |
|---|---|---|---|
| -0.4 | -1.0 | -0.8 | -0.6 |
| 0.8 | -0.4 | 0.8 | 1.0 |
| -0.8 | -0.6 | -0.8 | -1.0 |
FIG._9
| 0.0 | 0.0 | 0.0 |
|---|---|---|
| 1.0 | 2.0 | 1.0 |
| 0.0 | 0.0 | 0.0 |
FIG._10

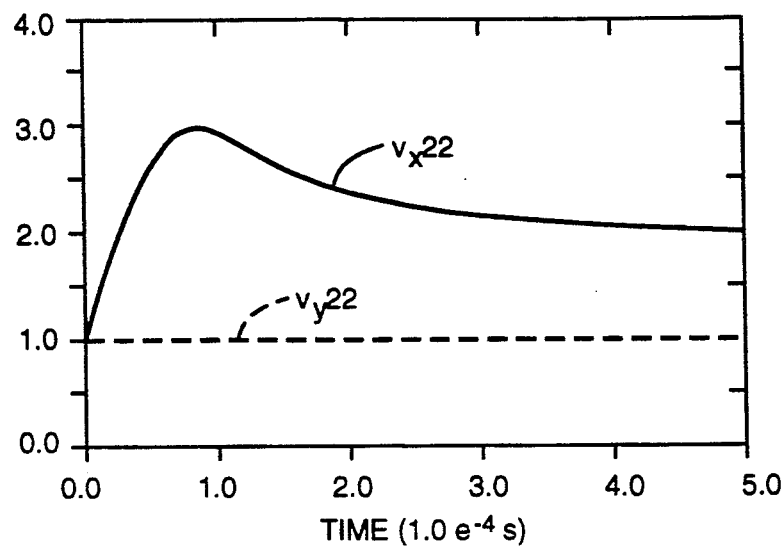
FIG._7D
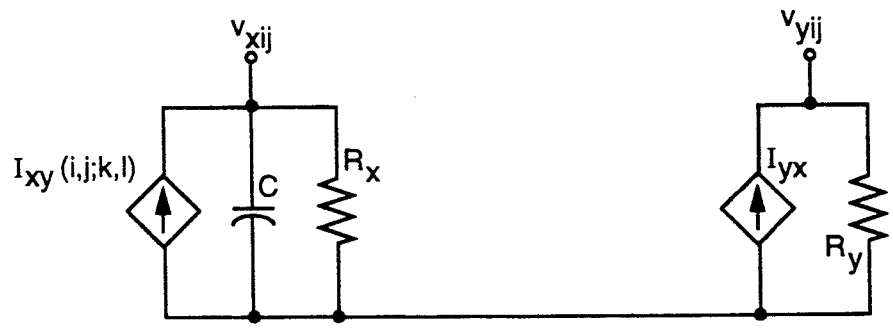
FIG._8A
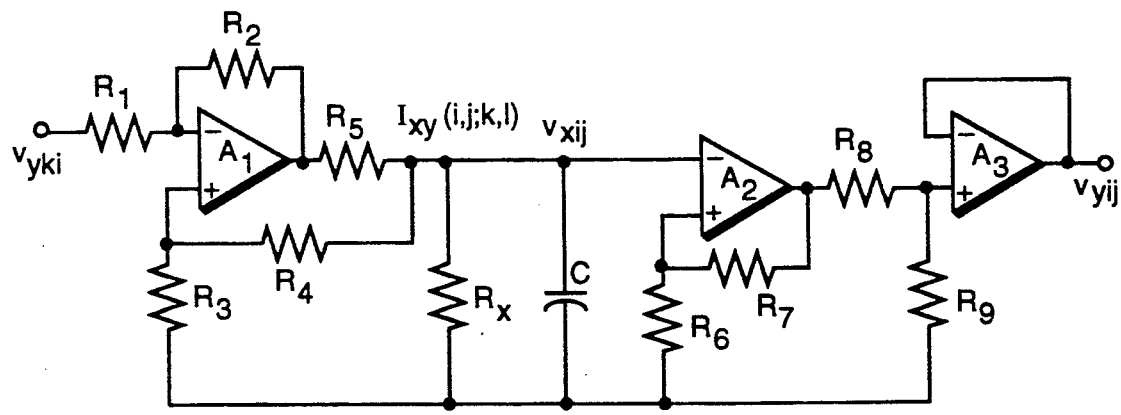
FIG._8B

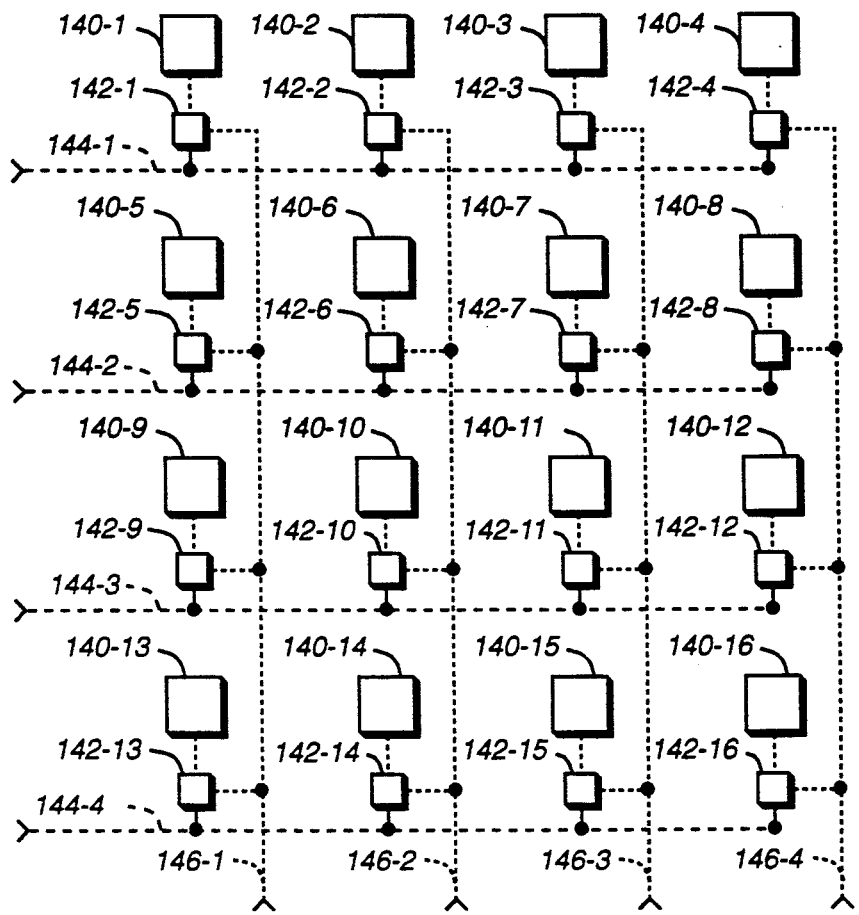
FIG._13
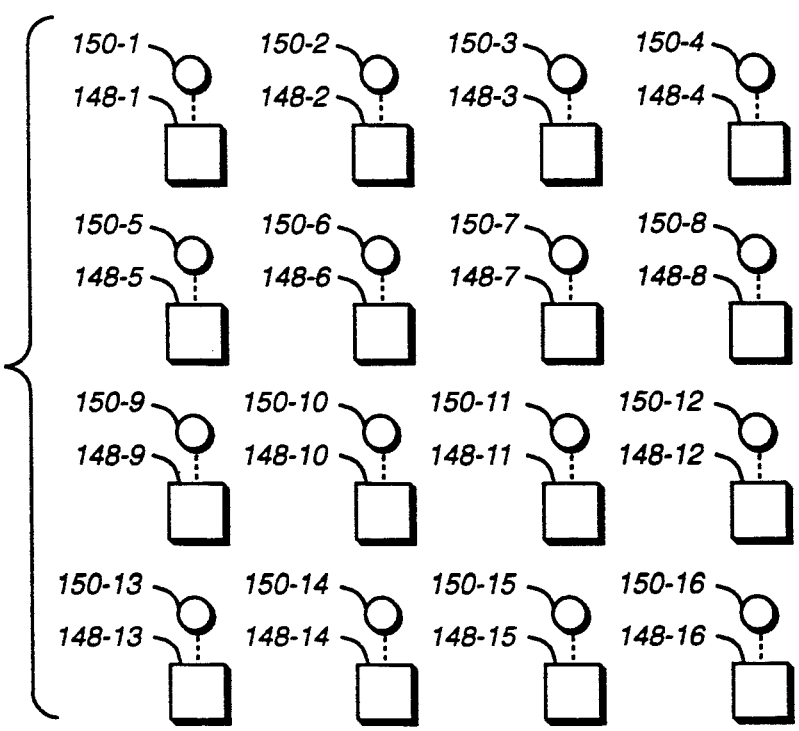
FIG._14

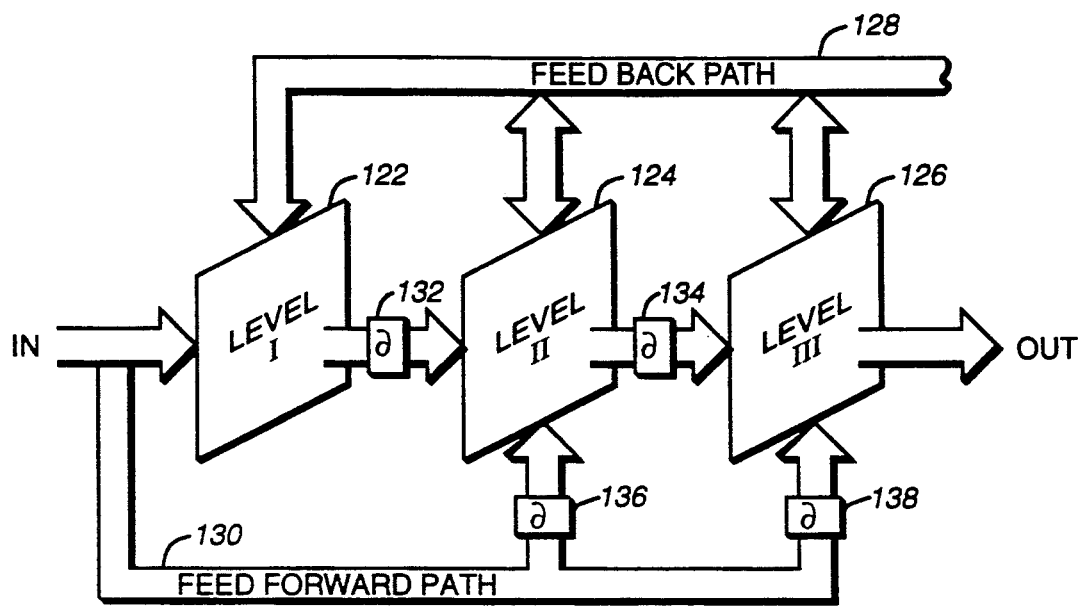
FIG._11
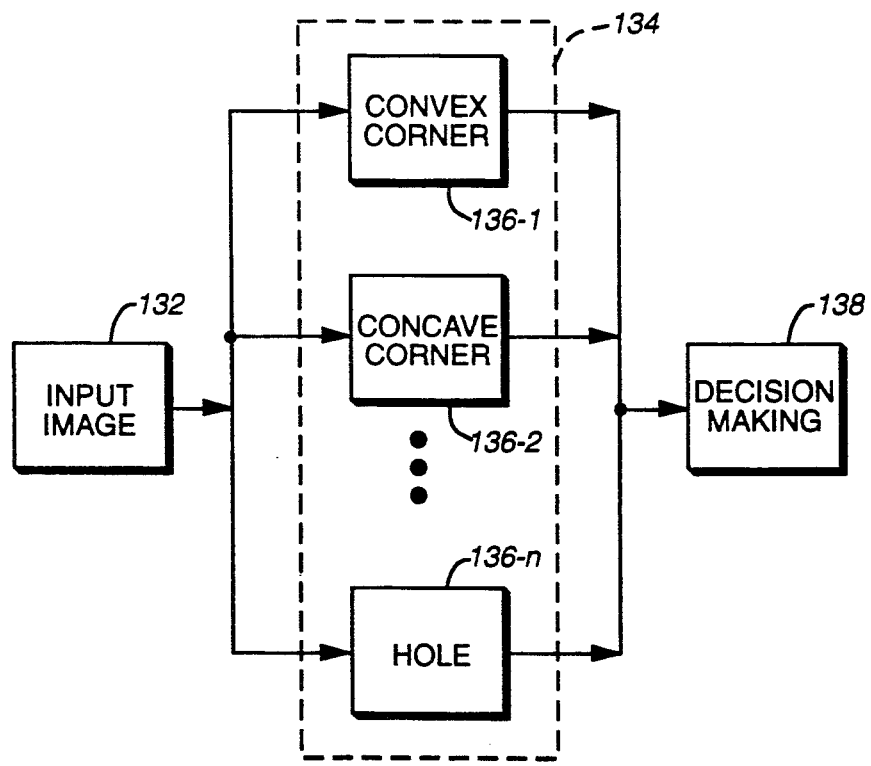
FIG._12

CELLULAR NEURAL NETWORK

This invention was made with Government support under Grant No. MIP-86-14000 and Contract No. N00014-86-K0351, awarded by NSF and ONR respectively. The Government has certain rights in this invention.

FIELD OF THE INVENTION

The present invention relates to a circuit architecture for image processing and pattern recognition, namely a cellular neural network (CNN).

BACKGROUND OF THE INVENTION

A CNN is a large scale network of an aggregate of regularly spaced circuit clones, called cells, which communicate with each other non-linearly only through one or more layers of the nearest neighbors in real time.

Conventional digital computation methods have run into a serious speed bottleneck due to their serial nature. To overcome this problem, a new computation model, called "neural networks," has been proposed, which is based on some aspects of neurobiology and adapted to integrated circuits. The key features of neural networks are asynchronous parallel processing, continuous-time dynamics, and global interaction of network elements. Some encouraging, if not impressive, applications of neural networks have been proposed for various fields, such as. optimization, linear and nonlinear programming, associative memory, pattern recognition and computer vision.

A new circuit architecture, called a cellular neural network, possesses some of the key features of neural networks and has important potential applications in such areas as image processing and pattern recognition.

The structure of cellular neural networks is similar to that found in cellular automata; namely, any cell in a cellular neural network is connected only to its neighbor cells. The adjacent cells can interact directly with each other. Cells not directly connected together may affect each other indirectly because of the propagation effects of the continuous-time dynamics of cellular neural networks.

A cellular neural network differs from Hopfield's neural networks and a cellular automata machine in the following ways:

(1) Mathematical Model

Cellular neural networks can be characterized by a set of difference (space) and differential (time) equations, which are much like partial differential equations. Hopfield's neural networks can be characterized by a set of ordinary differential equations, which include no space variables. The ordinary differential equation (ODE) and partial differential equation (PDE) are clearly different fields in mathematics. The cellular automata machine can be characterized by two-dimensional logic functions. Although it includes the space variables, the logic functions use only binary values for their input and output signals. Logic function analysis is also very different from the analysis of differential equations (which use real values as variables).

(2) System Model

Cellular neural networks and Hopfield's neural networks are both analog systems. The interactions of cells in an analog system depend on the connections among the cells. The operations of analog systems are based on Kirchhoff's Current Law (KCL) and Kirchhoff's Voltage Law (KVL). Analog systems have no timing clock and work asynchronously. Cellular automata machines are digital systems and are fundamentally different from analog systems.

(3) Interactive Rules

Cellular neural networks have feedback and feed-forward operations. In feedback operations, there is a self-feedback function. The connections among cells of the network are uniform and local. This means that a cellular neural network can be characterized by templates of its feedback and feed-forward operators. Hopfield's neural networks have only feedback operations, no feed-forward or self-feedback operations. The connections among neurons are generally global. There is no template concept for Hopfield's neural networks. Also, cellular automata machines have only feedback operations, no feed-forward or self-feedback operations.

Thus, it can be seen that cellular neural networks are not a combination of Hopfield's neural networks and cellular automata machines. All three of these architectures are models of the real physical system. They are based on very different mathematics and on trying to model the real physical system from different aspects. They appear to have similarities because they model the same physical system. One cannot derive any one of these three architectures from the other two.

SUMMARY OF THE INVENTION

In accordance with the present invention, a new circuit architecture, called a cellular neural network, which can perform parallel signal processing in real time, is disclosed. In view of the nearest neighbor interactive property of cellular neural networks, they are much more amenable to VLSI implementation than general neural networks. In spite of the "local nature" of the nearest neighbor interconnections, cellular neural networks are nevertheless imbued with some global properties because of the propagation effects of the local interactions during the transient regime. This transient regime can be exploited to show how the ability to analyze the "local" dynamics (via the dynamic route approach) will allow the system trajectories to be steered into a configuration of stable equilibria corresponding to some global pattern that is sought to be recognized. Indeed, the ability to control the local circuit dynamics stands out as one of most desirable features of cellular neural networks. Furthermore, cellular neural networks have practical dynamic ranges, whereas, general neural networks often suffer from severe dynamic range restrictions in the circuit implementation state.

BRIEF DESCRIPTION OF THE DRAWINGS

FIG. 1 is a two-dimensional simplified block schematic diagram of the present invention showing a CNN having the interconnections between the cells being only to the nearest neighbors.

FIG. 2 is a simplified block diagram showing the interconnections of a CNN between a single cell and each of its nearest neighbors, and self-feedback with itself.

FIG. 3 is a highly simplified representation of a three-dimensional configuration of a CNN of the present invention.

FIG. 4 is an illustration of the relationship of a cell and its concentric layers of neighbor cells.

FIG. 5A is a schematic representation of an equivalent circuit of a single cell, $C_{ij}$, of a CNN.

FIG. 5B is a schematic representation of another equivalent circuit of a single cell, $C_{ij}$, of a CNN.

FIG. 5C is a simplified schematic representation of the equivalent circuit of FIG. 5B.

FIGS. 6A-6B are graphical representations of examples of non-linear characteristics for current source, I, of FIG. 5.

FIGS. 7A-7D show the initial states, the final states, the output signals at steady state, and the transient voltage waveforms of cell C(2,2) of a 4×4 CNN.

FIGS. 8A-8B are schematic representations of an equivalent circuit and a circuit diagram of an op amp implementation of a simplified cell circuit of a CNN.

FIG. 9 is a gray scale value representation of a 4×4 pixel image.

FIG. 10 is a 3×3 neighborhood cloning template for a horizontal line detector CNN.

FIG. 11 is a block schematic representation of the interconnection between the layers of a multi-layer CNN.

FIG. 12 is a block diagram schematic representation of a CNN pattern recognition system.

FIG. 13 is a schematic block representation of a 4×4 CNN with the input and output signals multiplexed into and out of the CNN.

FIG. 14 is a schematic block representation of a 4×4 CNN for inputting signals into the CNN optically.

DESCRIPTION OF THE PREFERRED EMBODIMENT

A cellular neural network (CNN) is a multi-dimensional lattice array of a plurality of identical cells. In a two-dimensional planar array of cells, the array may be either square or rectangular. For the n-dimensional case, the array in any direction can have one or more cells, i.e., there does not have to be the same number of cells in each of the n-dimensions of the array. With respect to any single cell, the cells closest to it are its neighbor cells. Additionally, the neighbor cells of each cell expand concentrically from that single cell as layers of neighbors. Each cell in the array interacts non-linearly and in continuous time with a prescribed number of layers of its neighbor cells within the lattice. Adjacent cells can interact directly with each other, and cells not directly connected together may affect each other indirectly because of the propagation effects of the CNN. A CNN is capable of high-speed parallel signal processing.

The basic unit of a CNN is the cell. Each cell contains linear and nonlinear circuit elements, which may include linear capacitors, linear inductors, linear resistors, linear and nonlinear controlled sources, and independent sources.

Referring to FIG. 1 there is shown a 4×4 two-dimensional cellular neural network 10 by way of illustration. The cells C(i,j) are shown here in a square array of four rows and four columns with "i" representing the row number and "j" representing the column number. In FIG. 1 there are sixteen cells each shown schematically as being interconnected only to its nearest neighbors, i.e., the first layer of neighbor cells. For example, cell 12 {C(2,2)} is shown interconnected with cells 30–44 by links 14–28, respectively. Each of links 14–28 shown here are bi-directional links between the two cells to which that link is connected. In this example there is only one layer of neighbor interconnects between the cells with cells 30–44 substantially forming a circle around cell 12. If there were a second layer of neighbor interconnects, cell 12 would similarly also be interconnected with cells 46–58. This layer of neighbor cells forms only a partial circle due to the limited size of the CNN in this example.

FIG. 2 shows the extent of the interconnects 80–110 to and from a single cell 60 in a 3×3 CNN array with a single layer of neighbor interconnects to and from cells 62–76. Links 80, 84, 88, 92, 96, 100, 104, and 108 are feed-forward links, and links 82, 86, 90, 94, 98, 102, 106 and 110 are feedback links. Additionally, a self-feedback loop 78 from and to cell 60 is shown. To show all of the interconnects between each of the cells in this figure, the same level of detail would have to be added for each of cells 62–76.

Next, FIG. 3 is a schematic representation of a simple three-dimensional 4×4×3 CNN. In this figure, the intersection of each of the row, column and plane vectors represents the location of a cell C(i,j,k) where "i" represents the row number, "j" represents the column number, and "k" represents the plane number.

Referring to FIG. 11, there is shown a typical schematic representation of a multi-level CNN having levels 122–126. The input signal is shown being applied directly to level 122 and in feed forward path 130, via delays 136 and 138, to levels 124 and 126, respectively. In addition, the output signal from level 122 is applied to level 124 via delay 132, and the output signal from level 124 is applied to level 126 via delay 134. Finally, there is a feedback path 128 for feeding back signals from level 126 to level 124, and from level 124 to level 122. In this implementation the value of delay, $\delta$, for each of delays 132–138, is substantially equal.

In FIG. 4 there is shown a 7×7 matrix of cells with cell 114 at the center of that matrix. Also shown in this figure are three concentric layers of nearest neighbor cells of cell 114. The innermost layer 116, the next nearest layer 118 and the outermost layer 120. If the cell around which the layers of neighbors are being defined is not centered in the matrix, or if the matrix is rectangular, some of the layers will not totally surround the cell of interest with respect to the layers.

A typical example of a cell C(i,j) of a CNN is shown in FIG. 5A, where the suffixes u, x, and y denote the input, state, and output, respectively. The node voltage $V_{xij}$ of C(i,j) is called the state of the cell, and its initial condition is assumed to have a magnitude less than or equal to 1. The node voltage $V_{uij}$ is called the input of C(i,j) and is assumed to be a constant with magnitude less than or equal to 1. The node voltage $V_{yij}$ is called the output.

$$I_{xu}(i,j;k,l) = B(i,j;k,l)v_{ukl}, \quad I_{xy}(i,j;k,l) = A(i,j;k,l)v_{ykl}$$

$$I_{yx} = \frac{1}{2R_y}[|v_{xij} + 1| - |v_{xij} - 1|]$$

This is an example of a cell circuit wherein C is a linear capacitor; $R_x$ and $R_y$ are linear resistors; $E_{ij}$ is an independent voltage source; $I_{xu}(i,j;k,l)$ and $I_{xy}(i,j;k,l)$ are linear voltage controlled current sources with the characteristics $I_{xy}(i,j;k,l) = A(i,j;k,l)V_{ykl}$ and $I_{xu}(i,j;k,l) = B(i,j;k,l)V_{ukl}$ for all $C(i,j) \in N(i,j)$; $I_{yx} = (1/R_y) f(V_{xij})$ is a piecewise-linear voltage controlled current source with its characteristic f(.) as shown in FIGS. 6A and 6B; $E_{ij}$ is an independent voltage, source.

Observe from FIG. 5A that each cell C(i,j) contains one independent voltage source $E_{ij}$, one independent current source I, one linear capacitor C, two linear resistors $R_x$ and $R_y$ and at most 2 m linear voltage controlled current sources which are coupled to its neighbor cells via the controlling input voltage $V_{ukl}$, and the feedback from the output voltage $V_{ykl}$ of each neighbor cell C(k,l), where m is equal to the number of neighbor cells. In particular, $I_{xy}(i,j;k,l)$ and $I_{xu}(i,j;k,l)$ are linear voltage controlled current sources with the characteristics $I_{xy}(i,j;k,l)=A(i,j;k,l)V_{ykl}$ and $I_{xu}(i,j;k,l)=B(i,j;k,l)V_{ukl}$ for all $C(k,l) \in N_r(i,j)$. The only nonlinear element in each cell is a piecewise-linear voltage controlled current source $I_{yx}=(1/R_y)f(V_{xij})$ with characteristic f(.) of which the characteristics in FIGS. 6A and 6B are two examples. Note, the self-feedback condition is where i=j.

All of the linear and piecewise-linear controlled sources used in our cellular neural networks can be easily realized using operational amplifiers (op amps). A simple example of an op amp implementation of a cell circuit is given below. Without loss of generality, the cell circuit architecture in FIG. 5A will be used throughout the specification.

Referring next to FIG. 5B there is shown a current equivalent circuit of a CNN cell, $C_{ij}$. This circuit has the same circuit equations as those discussed above in relation to the voltage equivalent circuit of FIG. 5A. To illustrate the feedback, feed-forward and self feedback loops of the typical CNN cell in FIG. 5C, the voltage controlled current sources $I_{xy}$ and $I_{xu}$ are shown having been replaced by MOVCCS(A) and MOVCCS(B), respectively, where MOVCCS represents Multiple Output Voltage Controlled Current Sources. The output currents from MOVCCS(A) are the feedback currents with the exception of the current where i=k and j=l, that is the self-feedback current. The output currents from MOVCCS(B) are the feed-forward currents.

In FIG. 6A the representative characteristic for current source, I, in FIGS. 5A–C is shown as being a one-step sigmoidal function. Similarly, in FIG. 6B the characteristic represented is that of a multi-step sigmoidal function.

Applying Kirchhof's current law and Kirchhof's voltage law, the circuit equations of a cell are easily derived as follows:

State equation:

$$C \frac{dv_{xij}(t)}{dt} = -\frac{1}{R_x} v_{xij}(t) + \sum_{C(k,l) \in N_r(i,j)} A(i,j;k,l)v_{ykl}(t) + \sum_{C(k,l) \in N_r(i,j)} B(i,j;k,l)v_{ukl} + I, \quad (1a)$$

$1 \leq i \leq M; 1 \leq j \leq N.$

Output equation:

$$v_{yij}(t) = \frac{1}{2}(|v_{xij}(t) + 1| - |v_{xij}(t) - 1|), \quad (1b)$$

$1 \leq i \leq M; 1 \leq j \leq N.$

Input equation:

$$V_{uij} = E_{ij}, \quad 1 \leq i \leq M; 1 \leq j \leq N. \quad (1c)$$

Constraint conditions:

$$|V_{xij}(0)| \leq 1, \quad 1 \leq i \leq M; \quad 1 \leq j \leq N \quad (1d)$$

$$|V_{uij}| \leq 1, \quad 1 \leq i \leq M; \quad 1 \leq j \leq N. \quad (1e)$$

Parameter assumptions:

$$A(i,j;k,l) = A(k,l;i,j), \quad 1 \leq i, k \leq M; \quad 1 \leq j, l \leq N \quad (1f)$$

$$C > 0, R_x > 0. \quad (1g)$$

Remarks:

(a) All inner cells of a cellular neural network have the same circuit structures and element values. The inner cell is the cell which has $(2r+1)^2$ neighbor cells, where r is the number of layers of neighbor cells which are interconnected. All other cells are called boundary cells. A cellular neural network is completely characterized by the set of all nonlinear differential equations (1) associated with the cells in the circuit.

(b) Each cell of a cellular neural network has at most three nodes. (Sometimes we will choose $E_{ij}=0$ if $B(i,j;k,l)=0$ for all cells in a cellular neural network. In this case, there are only two nodes in a cell circuit.) Since all cells have the same datum node, and since all circuit elements are voltage controlled, cellular neural networks are ideally suited for nodal analysis. Moreover, since the interconnections are local, the associated matrix node equation is extremely sparse for large circuits.

(c) The dynamics of a cellular neural network have both output feedback and input control mechanisms. The output feedback effect depends on the interactive parameter A(i,j;k,l) and the input control effect depends on B(i,j;k,l). Consequently it is sometimes instructive to refer to A(i,j;k,l) as a feedback operator and B(i,j;k,l) as a control operator. The assumptions in (1f) are reasonable because of the symmetry property of the neighborhood system. Where i=j, A(i,j;k,l) is a self-feedback operator.

(d) The values of the circuit elements can be chosen conveniently in practice. $R_x$ and $R_y$ determine the power dissipated in the circuits and are usually chosen to be between 1kΩ and 1MΩ. $CR_x$ is the time constant of the dynamics of the circuit and is usually chosen to be $10^{-8} - 10^{-5}$ sec.

A. Dynamic Range of Cellular Neural Networks

Before discussing the design of a physical cellular neural network, it is necessary to know its dynamic range in order to guarantee that it will satisfy the assumptions in the dynamical equations stipulated above. The following theorem is the foundation of the CNN design.

Theorem 1

All states $V_{xij}$ in a cellular neural network are bounded for all time $t>0$ and the bound $V_{max}$ can be computed by, the following formula for any cellular neural network:

$$V_{max} = 1 + R_x|I| + R_x \max[\Sigma(|A(i,j;k,l)| + |B(i,j;k,l)|)]. \quad 1 \leq i \leq M, \quad 1 \leq j \leq N \quad C(k,l) \Sigma N_r(i,j) \quad (2)$$

For any cellular neural network, the parameters, $R_x$, C, I, A(i,j;k,l) and B(i,j;k,l) are finite constants, therefore the bounds on the states of the cells, $V_{max}$, are finite and can be computed via formula (2).

In actual circuit design, it is convenient to choose the scale of the circuit parameters such that $R_x|I| \approx 1$, $R_x|A(i,j;k,l)| \approx 1$ and $R_x|B(i,j;k,l)| \approx 1$, for all i, j, k, and l. Hence, the upper bound on the dynamic range of the cellular neural networks can easily be estimated. For example, if a neighborhood of the cellular neural network is $3 \times 3$, $V_{max} \approx 20$ V is possible, which is within the typical power supply voltage range of IC circuits.

B. Stability of Cellular Neural Networks

One application of cellular neural networks is in image processing. The basic function of a cellular neural network for image processing is to map, or transform an input image into a corresponding output image. Here, the output images are restricted to binary images with $-1$ and $+1$ as the pixel values. The input images can have multiple gray levels, however, provided that their corresponding voltages satisfy (1e). This means that an image processing cellular neural network must always converge to a constant steady state following any transient regime which has been initialized and/or driven by a given input image.

One of the most effective techniques for analyzing the convergence properties of dynamic nonlinear circuits is Lyapunov's method. Hence, it is necessary to define a Lyapunov function for cellular neural networks.

Such a Lyapunov function, E(t), for a cellular neural network is defined by the scalar function:

$$E(t) = -\frac{1}{2} \sum_{(i,j)} \sum_{(k,l)} A(i,j;k,l) v_{yij}(t) v_{ykl}(t) + \frac{1}{2R_x} \sum_{i,j} v_{yij}(t)^2 - \quad (3)$$

$$\sum_{(i,j)} \sum_{(k,l)} B(i,j;k,l) v_{yij}(t) t_{ukl} - \sum_{(i,j)} I v_{yij}(t).$$

Remarks:

(a) Observe that the above Lyapunov function, E(t), is only a function of the input, $V_u$, and output, $V_y$, voltages of the circuit. Although it does not possess the complete information contained in the state variables $V_{xij}$, we can nevertheless derive the steady-state properties of the state variables from the properties of E(t).

(b) The Lyapunov function, E(t), defined above, can be interpreted as the "generalized energy" of a cellular neural network, although its exact physical meaning is not very clear. As the following theorems will show, E(t) always converges to a local minimum, where the cellular neural network produces the desired output.

Theorem 2

The function E(t) defined in (3) is bounded by $$\max_t |E(t)| \leq E_{max} \quad (4a)$$

where $$E_{max} = \frac{1}{2} \sum_{(i,j)} \sum_{(k,l)} |A(i,j;k,l)| + \sum_{(i,j)} \sum_{(k,l)} |B(i,j;k,l)| + \quad (4b)$$

$$MN\left(\frac{1}{2R_x} + |I|\right)$$

for an $M \times N$ cellular neural network.

Theorem 3

The scalar function E(t) defined in (3) is a monotone-decreasing function, that is, $$\frac{dE(t)}{dt} \leq 0. \quad (5)$$

According to our definition of cellular neural networks, we have:

$$\frac{dE(t)}{dt} = -\sum_{|v_{xij}|<1} \frac{dv_{xij}(t)}{dt} \cdot \left[ \sum_{C(k,l) \in N_r(i,j)} A(i,j;k,l) v_{ykl}(t) - \right. \quad (6)$$

$$\left. \frac{1}{R_x} v_{xij}(t) + \sum_{C(k,l) \in N_r(i,j)} B(i,j;k,l) v_{ukl} + I \right]$$

Substituting the cell circuit equation (1) into (6), and recalling $C>0$ in assumption (1g), we obtain:

$$\frac{dE(t)}{dt} = -\sum_{|v_{xij}|<1} C \left[ \frac{dv_{xij}(t)}{dt} \right]^2 \leq 0. \quad (7a)$$

Remarks:

For future analysis (e.g., corollary to Theorem 4), it is convenient to rewrite (7a) as follows:

$$\frac{dE(t)}{dt} = -\sum_{|v_{xij}|<1} C \left[ \frac{dv_{xij}(t)}{dt} \right]^2$$

$$= -\sum_{|t_{vij}|<1} C \left[ \frac{dt_{vij}(t)}{dt} \right]^2$$

$$= -\sum_{(i,j)} C \left[ \frac{dv_{yij}(t)}{dt} \right]^2 \leq 0. \quad (7b)$$

From Theorems 2 and 3, we can easily prove the following important result:

Theorem 4

For any given input $V_u$ and any initial state $V_x$ of a cellular neural network, we have $$\lim_{t \to \infty} E(t) = \text{constant} \quad (8a)$$

and $$\lim_{t \to \infty} \frac{dE(t)}{dt} = 0. \quad (8b)$$

From Theorems 2 and 3, E(t) is a bounded monotone decreasing function of time t. Hence E(t) converges to a limit and its derivative converges to 0.

Corollary

After the transient of a cellular neural network has decayed to zero, a constant dc output is always obtained. In other words, $$\lim_{t \to \infty} v_{yij}(t) = \text{constant}, \quad 1 \leq i \leq M; 1 \leq j \leq N \quad (8c)$$

or $$\lim_{t \to \infty} \frac{dv_{yij}(t)}{dt} = 0, \quad 1 \leq i \leq M; 1 \leq j \leq N \quad (8d)$$

Next, investigate the steady-state behavior of cellular neural networks. It follows from Theorem 3 that under the condition (dE(t)/dt)=0, there are three possible cases for the state of a cell as t tends to infinity $$(1) \frac{dv_{xij}(t)}{dt} = 0 \text{ and } |v_{xij}(t)| < 1 \quad (9a)$$

$$(2) \frac{dv_{xij}(t)}{dt} = 0 \text{ and } |v_{xij}(t)| \geq 1 \quad (9b)$$

$$(3) \frac{dv_{xij}(t)}{dt} \neq 0 \text{ and } |v_{xij}(t)| \geq 1 \quad (9c)$$

because of the characteristic of the piecewise-linear output function (1b).

This will be clear upon consideration of FIG. 6A. When $|V_{xij}(t)| < 1$ we have $V_{yij}(t) = V_{xij}(t)$ and therefore $(dV_{yij}(t)/dt) = (dV_{xij}(t)/dt)$. From Theorem 4 and its corollary, case (1) follows. But for $|V_{xij}(t)| > 1$, since $V_{yij}(t)]V_{xij}(t)$, when $V_{yij}(t) = \pm 1$ is a constant, we do not have the precise waveform of $V_{xij}(t)$ In the case where $V_{xij}(t) = $ constant, we have case (2). Otherwise, case (3) applies and $V_{xij}(t)$ may be a periodic or an aperiodic, but bounded, function of time, in view of Theorem 1.

Returning now to the basic cell circuit (FIGS. 5A-5C) of the cellular neural networks, it can be seen that since the output signal of the time varying independent current source is a function of only the output voltages, $V_{ykl}(t)$, and the input voltages, $V_{ukl}$, of the neighborhood of the cell, it follows from the results of Theorem 4 that all of the steady-state output signals of our cellular neural network are constants. Hence, after the initial transients, the assumption that the time varying independent current source output signal is constant is valid for the study of the steady-state behavior of cellular neural networks. Summarizing the above observation:

Theorem 5

If the circuit parameters satisfy $$A(i,j;i,j) > \frac{1}{R_x} \quad (10)$$

then each cell of the cellular neural network must settle at a stable equilibrium point after the transient has decayed to zero. Moreover, the magnitude of all stable equilibrium points is greater than 1. In other words, we have the following properties:

$$\lim_{t \to \infty} |v_{xij}(t)| > 1, \quad 1 \leq i \leq M; 1 \leq j \leq N \quad (11a)$$

and $$\lim_{t \to \infty} v_{yij}(t) = \pm 1, \quad 1 \leq i \leq M; 1 \leq j \leq N \quad (11b)$$

Remarks:

(a) The above theorem is significant for cellular neural networks because it implies that the circuit will not oscillate or become chaotic.

(b) Theorem 5 guarantees that cellular neural networks have binary-value outputs. This property is crucial for solving classification problems in image processing applications.

(c) It can be easily shown by the same technique that without the constraint of (10) both case (1) and case (2) can co-exist but case (3) cannot. This implies that remark (a) is true even without the condition (10).

(d) Since A(i,j;i,j) corresponds to a feedback from the output of cell C(i,j) into its input, condition (10) stipulates a minimum amount of positive feedback in order to guarantee that the steady-state output of each cell is either +1 or −1. Note that this condition is always violated in a Hopfield neural network since its diagonal coupling coefficients are all assumed to be zero. To guarantee a similar ±1 binary output in the Hopfield model, it is necessary to choose an infinite slope in the linear region of the nonlinear function f(.) in FIG. 6A. In contrast, the corresponding slope in a cellular neural network is always chosen to be equal to one.

C. Simple Cellular Neural Network

A very simple example to illustrate how the cellular neural network described above works is presented here. This example will also help to provide a better understanding of the theorems of the preceding sections.

The cellular neural network 10 for this example is the same as that shown in FIG. 1, that is, the network size is 4×4. The circuit element parameters of the cell C(i,j) are chosen as follows.

For any $C(k,l) \in N_r(i,j)$ with r=1 (single layer of neighborhood cells), let $$A(i,j;i-1,j-1) = 0;$$
$$A(i,j;i-1,j) = 10^{-3}\Omega^{-1}$$
$$A(i,j;i-1,j+1) = 0$$
$$A(i,j;i,j-1) = 10^{-3}\Omega^{-1};$$
$$A(i,j;i,j) = 2.0 \times 10^{-3}\Omega^{-1};$$
$$A(i,j;i,j+1) = 10^{-3}\Omega^{-1}$$
$$A(i,j;i+1,j-1) = 0;$$
$$A(i,j;i+1,j) = 10^{-3}\Omega^{-1}$$
$$A(i,j;i+1,j+1) = 0$$
$$C = 10^{-9}F; R_x = 10^3\Omega; I = 0$$
$$B(i,j;k,l) = 0, \text{ for } C(k,l) \in N_1(i,j).$$

Since B(i,j;k,l)=0, the 3×3 coefficients A(i,j;k,l) alone determine the transient behaviors of the cellular neural network. Those coefficients will often be specified in the form of a square matrix, henceforth called the cloning template, which specifies the dynamic rule of the cellular neural network.

The dynamic equations of the cellular neural network corresponding to the above parameters are given by $$\frac{dv_{xij}(t)}{dt} = \quad (12a)$$

$$10^6[-v_{xij}(t) + 2v_{yij}(t) + v_{yij-1}(t) + v_{yi-1j}(t) + v_{yi+1j}(t) + v_{yij+1}(t)]$$

-continued and $$t_{yij}(t) = 0.5(|v_{xij}(t) + 1| - |v_{xij}(t) - 1|), \quad (12b)$$

for $1 \leq i \leq 4$; $1 \leq j \leq 4$.

It is convenient to recast the right-hand side of (12a) into the symbolic form $$\frac{dv_{xij}(t)}{dt} = -10^6 v_{xij}(t) + 10^6 \underbrace{\begin{bmatrix} 0 & 1 & 1 \\ 1 & 2 & 1 \\ 0 & 1 & 0 \end{bmatrix}}_{T} * v_{yij}(t) \quad (13)$$

with the help of the two-dimensional convolution operator * defined below:

For any cloning template, T, which defines the dynamic rule of the cell circuit, we define the convolution operator * by $$T * t_{ij} = \sum_{C(k,l) \in N_r(i,j)} T(k-i, 1-j) t_{kl} \quad (14)$$

where T(m,n) denotes the entry in the mth row and nth column of the cloning template, $m = -1, 0, 1$ and $n = -1, 0, 1$, respectively.

Note that in the above definition A(i,j;k,l) is assumed to be independent of i and j for this cellular neural network. This property is said to be space invariant, which implies that A(i,j;k,l) can be expressed as A(k-i,l-j). Unless stated otherwise, all cellular neural networks are assumed to have the space invariant property. This property allows us to specify the dynamic rules of cellular neural networks by using cloning templates.

To study the transient behavior of (12a), apply an initial voltage $V_{xij}(0)$ across the capacitor of each cell C(i,j). Each initial voltage may be assigned any voltage between $-1$ and $+1$, as stipulated in (1d).

The transient behavior of the above cellular neural network with the initial condition specified in the array of FIG. 7A has been simulated. The state variables of the circuit $V_x$, at $t = 5$ μS are shown in FIG. 7B. The maximum absolute value of the state variables at $t = 5$ μS is equal to 6, approximately. The upper bound $V_{max}$ of $V_x$ as computed from equation (2) of Theorem 1 is equal to 7, which is very close to 6.

The corresponding output voltages, $V_y$, at $t = 5$ μS are shown in FIG. 7C. Observe that all output variables assume binary values, either $+1$ or $-1$, as predicted by Theorem 5. (Here the condition $A(i,j;i,j) > 1/R_x$ is satisfied.)

The transient behavior of cell C(2,2) is displayed in FIG. 7D. The initial value of the state variable is equal to 1.0, and the value at $t = 5$ μS is equal to 2.02, approximately. The maximum value of $V_{x22}(t)$ is equal to 3 and occurs at $t = 0.8$ μS, approximately. Since the state variable is kept above 1.0 during the entire transient regime, the corresponding output remains constant at 1.0, as predicted from FIG. 6A.

Before investigating how many distinct values $V_{xij}(t)$ can assume in the steady state, consider first the following:

A stable cell equilibrium state, $V^*_{xij}$, of a typical cell of a cellular neural network is defined as the state variable $V_{xij}$ of cell C(i,j), which satisfies $$\left. \frac{dv_{xij}(t)}{dt} \right|_{\substack{v_{xij} = v^*_{xij}}} = 0 \text{ and } |v^*_{xij}| > 1 \quad (15)$$

under the assumption $V_{ykl} = \pm 1$ for all neighbor cells $C(k,l) \in N_r(i,j)$.

Equation (15) holds for any assumed combination of $V_{ykl} = \pm 1$, and, therefore, may not represent an actual component of an equilibrium state of the overall circuit.

For the current example, equivalently, the stable cell equilibrium states of a cell circuit C(i,j) are the solutions $V_{xij}$ of the dc cell circuit equations obtained by replacing all capacitors by open circuits; namely, $$V_{xij} = 2V_{yij} + V_{yi-1j} + V_{yi+1j} + V_{yij+1}, \quad (16a)$$

under the conditions:

$$|V_{xkl}| \leq 1, \; 1 \leq k, \; 1 \leq 4 \quad (16b)$$

and $$|V_{ykl}| = 1, \; 1 \leq k, \; 1 \leq 4. \quad (16c)$$

Substituting condition (16c) into the dc equation (16d) and using the sgn (.) function defined by $$sgn(x) = \begin{cases} 1, & x > 0 \\ 0, & x = 0 \\ -1, & x < 0 \end{cases}$$

$$V_{xij} = 2sgn(V_{yij}) + sgn(V_{yi-1j}) + sgn(V_{yi+1j}) + sgn(V_{yij-1}) + sgn(V_{yij+1}). \quad (17)$$

Furthermore, since sgn $(V_{yij}) = $ sgn$(V_{xij})$ from (1b), it follows that $$V_{xij} - 2sgn(V_{xij}) = sgn(V_{yi-1j}) + sgn(V_{yi+1j}) + sgn(V_{yij-1}) + sgn(V_{hij+1}). \quad (18)$$

Observe that the right-hand side of equation (18) can assume only five possible values; namely, $-4$, $-2$, $0$, $2$, and $4$. It follows that the corresponding values that can be assumed by the state variable $V_{xij}$ are $-6$, $-4$, $(-2$ or $2)$, $4$, and $6$.

It follows from the above analysis that each inner cell circuit for our present example can have only six possible stable cell equilibrium states; namely, $-6$, $-4$, $-2$, $2$, $4$, and $6$.

The actual stable cell equilibrium state attained by each cell clearly depends on its initial state as well as on those of its neighbor cells. Hence a cell may eventually approach any one of its stable equilibrium states even if its initial state remains unchanged.

A stable system equilibrium point of a cellular neural network is defined to be the state vector with all its components consisting of stable cell equilibrium states.

It follows from the above definition that a cellular neural network is always at one of its stable system equilibrium points after the transient has decayed to zero. From the dynamic system theory point of view, the transient of a cellular neural network is simply the trajectory starting from some initial state and ending at an equilibrium point of the system. Since any stable system equilibrium point, as defined above, of a cellular neural network is a limit point of a set of trajectories of the corresponding differential equations (1), such an attracting limit point has a basin of attraction; namely, the union of all trajectories converging to this point. Therefore, the state space of a cellular neural network can be partitioned into a set of basins centered at the stable system equilibrium points.

Generally speaking, a cellular neural network processes signals by mapping them from one signal space into another one. In our example, the cellular neural network can be used to map an initial state of a system into one of many distinct stable system equilibrium points. If we consider the initial state space as $[-1.0, 1.0]^{M \times N}$ and the output space as $\{-1,1\}^{M \times N}$, then the dynamical map F, can be defined as $$F: [-1.0, 1.0]^{M \times N} \to \{-1, 1\}^{M \times N}. \tag{19}$$

This means that the map F can be used to partition continuous signal space into various basins of attraction of the stable system equilibrium points via a dynamic process. This property can be exploited in the design of associative memories, error correcting codes, and fault-tolerant systems.

In general, the limit set of a complex nonlinear system is very difficult, if not impossible, to determine, either analytically or numerically. Although, for piecewise-linear circuits, it is possible to find all dc solutions by using either a brute force algorithm or some more efficient ones, it is nevertheless very time consuming for large systems. For cellular neural networks, in view of the nearest neighbor interactive property, all system equilibrium points can be solved by first determining the stable cell equilibrium states, and then using the neighbor interactive rules to find the corresponding system equilibrium points.

The dynamic behavior of a cellular neural network with zero control operators and nonzero feedback operators is reminiscent of a two-dimensional cellular automaton. Both of them have the parallel signal processing capability and are based on the nearest neighbor interactive dynamic rules. The main difference between a cellular neural network and a cellular automata machine is in their dynamic behaviors. The former is a continuous time while the latter is a discrete-time dynamical system. Because the two systems have many similarities, cellular automata theory can be used to study the steady state behavior of cellular neural networks. Another remarkable distinction between them is that while the cellular neural networks will always settle to stable equilibrium points in the steady state, a cellular automata machine is usually imbued with a much richer dynamical behavior, such as periodic, chaotic and even more complex phenomena. Cellular neural networks have been tamed by choosing a sigmoid nonlinearity. If some other nonlinearity were chosen for the nonlinear elements, many more complex phenomena would also occur in cellular neural networks.

D. Multilayer Cellular Neural Networks

The single-layer cellular neural network of FIG. 1 can be generalized to a multilayer cellular neural network. Instead of only one state variable in the single-layer case there may be several state variables in each cell of a multilayer cellular neural network. The concept of multilayering emphasizes the interactions of the state variables on the same layer. To avoid clutter, it is convenient to use the convolution operator * in the following discussion. Using the convolution operator, equation (1a) can be rewritten as $$C \frac{dv_{xij}(t)}{dt} = \frac{-1}{R_x} v_{xij}(t) + A * v_{yij}(t) + B * v_{uij} + I, \tag{20}$$

$$1 \leq i \leq M; 1 \leq j \leq N.$$

Then, for multilayer cellular neural networks, the cell dynamic equations can be expressed in the following compact vector form:

$$C \frac{dv_{xij}(t)}{dt} = -R^{-1} v_{xij}(t) + A * v_{yij}(t) + B * v_{uij} + I, \tag{21}$$

$$1 \leq i \leq M; 1 \leq j \leq N$$

$$C = \begin{pmatrix} C_1 & 0 & 0 \\ 0 & \ddots & 0 \\ 0 & 0 & C_m \end{pmatrix} \tag{22a}$$

$$R = \begin{pmatrix} R_{lz} & 0 & 0 \\ 0 & \ddots & 0 \\ 0 & 0 & R_{mz} \end{pmatrix}$$

$$A = \begin{pmatrix} A_{11} & 0 & 0 & 0 & 0 \\ \cdot & \cdot & 0 & & 0 \\ \cdot & & \cdot & 0 & 0 \\ \cdot & & & \cdot & 0 \\ A_{ml} & \cdot & \cdot & \cdot & A_{mm} \end{pmatrix} \tag{22b}$$

$$B = \begin{pmatrix} B_{11} & 0 & 0 & 0 & 0 \\ \cdot & \cdot & 0 & & 0 \\ \cdot & & \cdot & 0 & 0 \\ \cdot & & & \cdot & 0 \\ B_{ml} & \cdot & \cdot & \cdot & B_{mm} \end{pmatrix}$$

$$v_{xij} = \begin{pmatrix} v_{1xij} \\ \cdot \\ \cdot \\ \cdot \\ v_{mxij} \end{pmatrix} v_{yij} = \begin{pmatrix} v_{1yij} \\ \cdot \\ \cdot \\ \cdot \\ v_{myij} \end{pmatrix} v_{uij} = \begin{pmatrix} v_{1uij} \\ \cdot \\ \cdot \\ \cdot \\ v_{muij} \end{pmatrix} \tag{22c}$$

$$I = \begin{pmatrix} I_l \\ \cdot \\ \cdot \\ \cdot \\ I_m \end{pmatrix} \tag{22d}$$

and where m denotes the number of the variables in the multilayer cell circuit. Here, the convolution operator * between a matrix and a vector is to be decoded like matrix multiplication but with the operator * inserted between each entry of the matrix and of the vector.

Observe that C and R are diagonal matrices, whereas A and B are block triangular matrices.

Remarks:

(a) For multilayer cellular neural networks, all of the results presented in the previous sections still hold with some minor modifications. The stability can be proved from the bottom layer (layer 1) to the upper ones by noting the block triangular structures of the A and B matrices.

(b) Since there are several state variables in a cell circuit, multiple dynamic rules can be chosen concurrently for the different state variables. This property makes the network extremely flexible and allows more complicated image processing problems to be dealt with.

(c) In addition to using multiple dynamic rules as mentioned in (b), different time constants can be chosen for the different state variables of the cell circuits. As a limiting case, $C_q = 0$ can be chosen for some state variable $V_{qxij}$, thereby obtaining a set of differential and algebraic equations. This property yields even more flexibility in the design of cellular neural networks for practical problems.

The circuit in FIG. 8A is an equivalent circuit of a simplified cell circuit of cellular neural networks. It consists of the basic circuit elements, namely, a linear capacitor C; a linear resistor $R_x$; a linear voltage controlled current source $I_{xy}(i,j;k,l) = A(i,j;k,l)V_{ykl}$; a subcircuit with the piecewise-linear function $V_{yij} = 0.5(|V_{xij}(t)+1| - |V_{xij}(t)-1|)$.

One possible op amp implementation of the above circuit is shown in FIG. 8B. The voltage controlled current source $I_{xy}(i,j;k,l)$ is realized by op amp $A_1$ and resistors $R_1-R_5$. It can be shown that $$I_{xy}(i,j;k,l) = \frac{-R_2}{R_1 R_5} v_{ykl} \quad (23)$$

under the condition that $$\frac{R_2}{R_1} = \frac{R_4 + R_5}{R_3} \quad (24)$$

The output resistance of $I_{xy}(i,j;k,l)$ is infinite under condition (24). The piecewise-linear function $V_{yij}(V_{xij})$ is realized by op amps $A_2$, $A_3$ and resistors $R_6-R_9$ with the constraint that $$\frac{R_6 + R_7}{R_6} = \frac{R_8 + R_9}{R_9} + |V_{cc}| \quad (25)$$

where $V_{cc}$ is the voltage of the power supply.

The two circuits in FIGS. 8A and 8B are equivalent in the sense that they have the same state and output equations.

In the following example, a cellular neural network is used to solve image processing and pattern recognition problems. Only the steady-state behavior of cellular neural networks is stressed. However, for applications in image processing, the transient behavior is equally important. In fact, it is the transient behavior which makes it possible to extract a variety of features from a single picture, and to solve various image processing problems.

The basic function of a cellular neural network for image processing is to map or transform an input image into a corresponding output image. Here, we restrict our output images to binary images with $-1$ and $+1$ as the pixel values. However, the input images can have multiple gray levels, provided that their corresponding voltages satisfy equation (1e). This means that the image processing cellular neural network must always converge to a constant steady state following any transient regime which has been initialized and/or driven by a given input image. It has also been proven that cellular neural networks are completely stable.

A circuit is said to be "completely stable" if and only if every trajectory tends to an equilibrium state. Consequently, such a circuit cannot oscillate or become chaotic.

After the transient has settled down, a cellular neural network always approaches one of its stable equilibrium points. In other words, $$\lim_{t \to \infty} v_{xij}(t) = \text{constant} \quad 1 \leq i \leq M; 1 \leq j \leq N \quad (26)$$

or $$\lim_{t \to \infty} \frac{dv_{xij}(t)}{dt} = 0, \quad 1 \leq i \leq M; 1 \leq j \leq N. \quad (27)$$

Moreover, if the circuit parameters satisfy $$A(i,j;i,j) > \frac{1}{R_x} \quad (28)$$

then $$\lim_{t \to \infty} |v_{xij}(t)| \geq 1, \quad 1 \leq i \leq M; 1 \leq j \leq N \quad (29)$$

or equivalently, $$\lim_{t \to \infty} v_{yij}(t) = \pm 1, \quad 1 \leq i \leq M; 1 \leq j \leq N. \quad (30)$$

This is significant for cellular neural networks, because it implies that the circuit will not oscillate or become chaotic. Further, satisfaction of equation (28) guarantees that the cellular neural network will have binary-value output values. This property is crucial for solving classification problems in image processing applications.

In order to perform signal processing, pattern recognition, or other functions that a CNN can be called upon to perform, a circuit configuration similar to that shown in FIG. 12 will be necessary. In this system an interface system 132 is used to apply the image to be processed simultaneously onto each CNN 136-x in the pattern recognition block 134. The output signals from each of the CNNs 136-x in block 134 are supplied to the decision making block 138.

For example, if the circuit of FIG. 12 is to be used to determine if the image that is being applied to the

TABLE I

| | Comparison of Three Mathematical Models Having Spatial Regularities | | |
|---|---|---|---|
| Model | Cellular Neural Network | Partial Differential Equation | 2-D Cellular Automata |
| time | continuous | continuous | discrete |
| space | discrete | continuous | discrete |

TABLE I-continued

Comparison of Three Mathematical Models Having Spatial Regularities

| Model | Cellular Neural Network | Partial Differential Equation | 2-D Cellular Automata |
|---|---|---|---|
| state value | real | real | binary number |
| dynamics | nonlinear | linear | nonlinear | pattern recognition block 134 is that of a chair with certain characteristics, each of CNNs 136-x will have a circuit element for each pixel in the image. Each pixel of the image is applied to the corresponding circuit of each CNN in bank 134. Additionally, each CNN 136-x is programed with a different cloning template, wherein each cloning template is selected to enable the CNN to which it is applied to detect one characteristic of the chair of interest, e.g., CNN 136-1 has been programed to look for a convex corner, CNN 132-2 has been programed to look for a concave corner, and CNN 132-n has been programed to look for a hole. The input image could also be examined by numerous additional CNNs to look for additional features. Here it should be noted that whether one feature, or 100 features, are looked for in an image, one need only add additional CNNs to perform the desired functions. The CNN bank requires no more time to look for 100 characteristics than it does for 1 since CNNs 136-x functions in parallel with each other. In a simple application, such as the chair recognition system, the output signal from each CNN can be a binary signal.

Decision making block 138 could be a state machine that takes the binary information from the CNNs and, from those signals, determines if the image was that of a particular type of chair. Decision block 138 might also be another bank of CNNs which processes the signals from pattern recognition bank 134 to determine if the type of chair that was imaged onto bank 134 was of a particular design represented by the individual cloning templates used in the CNNs of decision block 138. In order to understand why cellular neural networks can be used for image processing, first approximate the differential equation (1a) by a difference equation. In particular, let t=nh, where h is a constant time step, and approximate the derivative of $V_{xij}(t)$ by its corresponding difference form $$\frac{C}{h}[v_{xij}((n+1)h) - v_{xij}(nh)] = -\frac{1}{R_x} v_{xij}(nh) + \tag{29a}$$

$$\sum_{C(k,l)\epsilon N_r(i,j)} A(i,j;k,l)v_{yk}(nh) + \sum_{C(k,l)\epsilon N_r(i,j)} B(i,j;k,l)v_{ukl} + I,$$

$$1 \leq i \leq M; 1 \leq j \leq N$$

and $$v_{yij}(nh) = 0.5R_y(|v_{xij}(nh) + 1| - |v_{xij}(nh) - 1|) \tag{29b}$$

$$\equiv f(v_{xij}(nh)),$$

$$1 \leq i \leq M; 1 \leq j \leq N.$$

Let $$I_{ij} = \sum_{C(k,l)\epsilon N_r(i,j)} B(i,j;k,l)v_{ukl} + I, \tag{30}$$

$$1 \leq i \leq M; 1 \leq j \leq N.$$

recasting equation (29a) into the form $$v_{xij}(n+1) = v_{xij}(n) + \frac{h}{C}\left[\frac{-1}{R_x} v_{xij}(n) + \right. \tag{31}$$

$$\left. \sum_{C(k,l)\epsilon N_r(i,j)} A(i,j;k,l) v_{yk}(n) + I_{ij}\right],$$

$$1 \leq i \leq M; 1 \leq j \leq N$$

where the time step h has been suppressed from "nh" for simplicity; i.e., $V_{xij}(n) \equiv V_{xij}(nh)$ and $V_{yij}(n) \equiv V_{yij}(nh)$.

Substituting equation (29b) for $V_{ykl}(n)$ in equation (31), $$v_{xij}(n+1) = v_{xij}(n) + \frac{h}{C}\left[\frac{-1}{R_x} v_{xij}(n) + \right. \tag{32}$$

$$\left. \sum_{C(k,l)\epsilon N_r(i,j)} A(i,j;k,l)f(v_{xkl}(n)) + I_{ij}\right],$$

$$1 \leq i \leq M; 1 \leq j \leq N..$$

Equation (32) can be interpreted as a two-dimensional filter for transforming an image, represented by $V_x(n)$, into another one, represented by $V_x(n+1)$. The filter is nonlinear because $f(V_{xkl}(n))$ in equation (32) is a nonlinear function. Usually, the filter is space invariant for image processing, which means that $A(i,j;k,l) = A(i-k, j-l)$ for all i, j, k, and l. The property of the filter is determined by the parameters in equation (32).

For the one-step filter in equation (32), the pixel values, $V_{xij}(n+1)$, of an image are determined directly from the pixel values, $V_{xij}(n)$, in the corresponding neighborhood. From the practical point of view, this neighborhood is always chosen to be as small as possible. A typical choice is the 3×3 neighborhood. Therefore, a one-step filter can only make use of the local properties of images.

When the global properties of an image are important, the above one-step filter can be iterated n times to extract additional global information from the image. One well known property of the iterative filter is the so-called propagation property, which asserts that the pixel values of the output image after n iterations can be indirectly affected by a larger neighbor region of the input image. This property can be observed by substituting $V_{xij}(n)$ in equation (32) iteratively down to $t_{xij}(0)$, which coincides with the input image. Since equation (32) contains some nonlinear functions, it is convenient to represent $V_{xij}(n)$ by $$v_{xij}(n) = \sum_{C(k,l)\epsilon N_{nr}(i,j)} g^n_{ijkl}(v_{xkl}(0)), \tag{33}$$

$$1 \leq i \leq M; 1 \leq j \leq N$$

where $g^n_{ijkl}$ is a nonlinear function, which depends on (i,j), (k,l), and n. Note that the larger neighborhood is n times larger than the local neighborhood and depends on the iteration number n. It is easy to see that when the iteration number n is sufficiently large, the larger neighborhood will eventually cover the entire image.

Therefore, the propagation property of iterative filters makes it possible to extract some global features in images. Of course, the local properties are still preserved in iterative filters with the closer neighbors having more effect than those farther away.

Now, it is not difficult to understand how cellular neural networks can be used for image processing. Indeed, if $h \to 0$ in equation (29a), the system equation (1a-g) defining a cellular neural network is recovered. To understand the image transform mechanism in cellular neural networks, rewrite equation (1a) in its equivalent integral form as follows:

$$v_{xij}(t) = v_{xij}(0) + \frac{1}{C} v_o{}^t \left[ \frac{-1}{R_x} v_{xij}(\tau) + f_{ij}(\tau) + g_{ij}(u) + I \right] d\tau, \quad (34a)$$

$1 \leq i \leq M; 1 \leq j \leq N,$ where:

$$f_{ij}(t) = \sum_{C(k,l) \in N_r(i,j)} A(i,j;k,l) v_{ykl}(t) \quad (34b)$$

and $$g_{ij}(u) = \sum_{C(k,l) \in N_r(i,j)} B(i,j;k,l) v_{ukl}. \quad (34c)$$

Equation (34a) represents the image at time t, which depends on the initial image $V_{xij}(0)$ and the dynamic rules of the cellular neural network. Therefore, we can use a cellular neural network to obtain a dynamic transform of an initial image at any time t. In the special case where $t \to \infty$, the state variable $V_{xij}$ tends to a constant and the output $V_{yij}$ tends to either $+1$ or $-1$ as stated in equation (30).

E. A Simple Image Transform

Before considering real image processing problems, it is instructive to look at a very simple example. Although it is a much simplified image processing problem, this example will help to understand some of the dynamic behavior of cellular neural networks and to derive some intuitive ideas on how to design cellular neural networks for solving a specific practical image processing problem.

One important problem in image processing is pixel classification. To illustrate this concept, consider a small image, the gray scale representation of that image is a 4×4 pixel space shown in FIG. 9. This image is a 4×4 pixel array with each pixel value $P_{ij} \in [-1,1]$, for $1 \leq i \leq 4$ and $1 \leq j \leq 4$. Assume that the pixel value $-1$ corresponds to a white background, the pixel value $+1$ corresponds to a black object point value, and the pixel values between $-1$ and $+1$ correspond to the gray values. The pixel classification problem is to classify each pixel of the image into two or more classes.

From the mathematical point of view, pixel classification can be considered as a map, F, which maps a continuous vector space into a discrete vector space as defined below:

$$F:[a,b]^{M \times N} \to \{A,B,C,\ldots\}^{M \times N} \quad (35)$$

where M×N is the number of pixels in an image and A,B,C, ... stand for different classes. For this example, we wish to assign to each pixel in the array one of the two values, $-1$ and $+1$, based on some classification rules and the original pixel values. So, F is defined by $$F:[-1.0,1.0]^{M \times N} \to \{-1,1\}^{M \times N}. \quad (36)$$

Suppose the object is to design a horizontal line detector to filter out the horizontal lines in the input image in FIG. 9 by using a cellular neural network. In order to simplify the analysis, a very simple dynamic rule for this "horizontal line detector" circuit is chosen. The circuit element parameters of the cell C(i,j) are chosen as follows:

$C = 10^{-9} F; R_x = 10^3 \Omega; I = 0$ $A(i,j;i-1,j-1) = A(i,j;i-1,j)$
$\qquad = A(i,j;i-1,j+1) = 0$
$A(i,j;i,j) = 2 \times 10^{-3} \Omega^{-1};$
$A(i,j;i,j-1) = A(i,j;i,j+1) = 10^{-3} \Omega^{-1}$
$A(i,j;i+1,j-1) = A(i,j;i+1,j)$
$\qquad = A(i,j;i+1,j+1) = 0$ for a 3×3 neighborhood system. Since the feedback operators A(i,j;k,l), as shown above, are independent of the absolute position of the cell, we can simplify the expressions of A(i,j;k,l) by coding them as follows:

$A(-1,-1) = A(-1,0) = A(-1,1) = 0$
$A(0,0) = 2 \times 10^{-3}$
$A(0,-1) = A(0,1) = 10^{-3} \Omega$
$A(1,-1) = A(1,0) = A(1,1) = 0.$ The indices in the above interactive parameters indicate the relative positions with respect to C(i,j). The cellular neural network has the space invariance property, that is, $A(i,j;k,l) = A(i-k,j-1)$ for all i, j, k, and l. Therefore, as in image processing filters, a cloning template, as shown in FIG. 10, can be used to describe the feedback operator of the cell, henceforth called a feedback operator cloning template. The cloning template is constructed as follows: the center entry of the cloning template corresponds to A(0,0); the upper left corner entry of the cloning template corresponds to A(−1,−1); the lower right-hand corner entry of the cloning template corresponds to A(1,1); and so forth. From the above and following discussions it should be clear that given the desired function of a CNN, say the recognition of a particular character or shape, the individual templates for each cell of the CNN can be derived. Further, it should be clear that the template of each cell is loaded into that cell by selecting the circuit element and gain values to provide the feedback, self-feedback and feedforward values specified by the -template. Since it is extremely convenient and clear to characterize the interactions of a cell with its neighbors by means of a cloning template, the cloning template expression will be used in the following examples.

The dynamical equations of the cellular neural network corresponding to the above parameters are given by $$\frac{dv_{xij}(t)}{dt} = 10^6[-v_{xij}(t) + v_{yij-1}(t) + 2v_{yij}(t) + v_{yij+1}(t)] \quad (37a)$$

and $$v_{yij}(t) = 0.5(|v_{xij}(t) + 1| - |v_{xij}(t) - 1|), \quad (37b)$$
for $1 \leq i \leq 4; 1 \leq j \leq 4.$ Note that the control operator B(i,j;k,l)=0 for all i, j, k, and l in this circuit, and $A(i,j;k,l) > 1/R_x$ as stipulated in the condition of equations (28)-(30).

For this example, the initial state of the cellular neural network is the pixel array in FIG. 9. From the circuit equation (37), we note that the derivative of the pixel values depends on their left and right neighbors. This particular dynamic rule will therefore enhance the detection of horizontal lines in the original image.

The circuit equations (37 and 37b) are first-order nonlinear ordinary differential equations. In system theory, they are also called a piecewise-linear autonomous system. In general, it is difficult if not impossible to predict the behaviors of complex nonlinear dynamical systems. The analysis above shows that the circuit in this example will tend to one of its equilibrium points after its transient has settled down.

The equilibrium points (steady state) of the system can be found by solving the equivalent dc circuit equations (replace all capacitors by open circuits):

$$v_{xij}(t) = v_{yij-1}(t) + 2v_{yij}(t) + v_{yij+1}(t) \quad (38a)$$

$$v_{yij}(t) = 0.5(|v_{xij}(t) + 1| - |v_{xij}(t) - 1|), \quad (38b)$$
$$1 \leq i \leq 4; 1 \leq j \leq 4$$

In general, for piecewise linear circuits, all solutions of the dc circuit equations can be found either by the brute force algorithm or by using some more efficient algorithms known in the art. However, even for this very simple example, there are 32 unknown variables and 32 equations (16 linear equations and 16 piecewise-linear equations). It is time consuming to find all of the equilibrium points of a cellular neural network by using the algorithms mentioned above because of the large size of its circuit equations. (Note that if the nonlinearity of the circuit is not piecewise-linear, there is no general method to find all of its equilibrium points.)

To simplify the problem, the various features of cellular neural networks can take advantage of the analysis. As mentioned before, every cell in a cellular neural network has the same connections as its neighbors. Therefore, each cell's circuit equation is the same as that of the other cells in the same circuit. (Without loss of generality, boundary effects can be ignored.) Hence, the global properties of a cellular neural network can be understood by studying the local properties of a single cell. This approach is extremely useful for the analysis and design of cellular neural networks.

Before analyzing this example, it is helpful to recall the following definitions:

Definition 1: Cell Equilibrium State

A cell equilibrium state $V^*_{xij}$ of a cell circuit $C(i,j)$ in a cellular neural network with dc input voltages $V_{ukl}$ is any value of the state variable $V_{xij}$ which satisfies $$(a) \left. \frac{dv_{xij}(t)}{dt} \right|_{v_{xij}=v_{xij}} = 0 \quad (39a)$$

(b) $v_{ykl} = \pm 1$ for all neighbor cells $C(k,l) \in N_r(i,j)$. (39b)

It follows from Definition 1 that the set of all cell equilibrium states of a cell circuit $C(i,j)$ can be found by equating the right-hand side of equation (1a) to zero and by setting $V_{ykl}$ to be any combination of $\pm 1$, and then solving for $V_{xij}$. Note that since the resulting equation is decoupled from the rest, it can be trivially solved. On the other hand, many of these solutions could be extraneous since when the entire coupled system equation (1) is solved for its equilibrium points, some combinations of $V_{yij} = \pm 1$ may not satisfy these equations.

Observe also that it is possible for a cell equilibrium state to have an absolute value less than one, in which case, even if this is a valid solution, it would not be observable (i.e., unstable) in view of equations (28)-(30), assuming that $A(i,j;k,l) > 1/R_x$. We will usually be interested only in those cell equilibrium states having a magnitude greater than one.

Definition 2: Stable Cell Equilibrium States

A cell equilibrium state $V^*_{xij}$ of a cell circuit $C(i,j)$ is said to be stable if and only if $$|V^*_{xij}| > 1. \quad (40)$$

Observe that since the observable (i.e., stable) output variable $V_{yij}$ of each cell $C(i,j)$ can assume only the values $+1$ or $-1$, it follows that any observable output solution vector, $V_y$, of any cellular neural network with $A(i,j;k,l) > 1/R_x$ must necessarily be located at a vertex of an n-dimensional hypercube S, where $n = M \times N$ denotes the total number of cells. If we let $S_o$ denote the set of all n-dimensional vectors, $V_y$, whose components, $V_{yij}$, correspond to all combinations of stable cell equilibrium points, then $S_o$ can have at most $2^m$ members, henceforth called the set of virtual equilibrium output vectors. We use the adjective "virtual" to emphasize that some members of $S_o$ may not be valid equilibrium points of the overall circuit. This is because some of the arbitrary combinations of $V_{ykl} = \pm 1$ used in calculating the circuit equilibrium states may not correspond to actual solutions obtained by solving the complete coupled systems of algebraic equations (2) with the left-hand side of equation (1a) set equal to zero.

Definition 3: Stable System Equilibrium Point

A stable system equilibrium point of a cellular neural network with $A(i,j;k,l) > 1/R_x$ is any equilibrium state vector, $V_x$, whose state variable components, $V_{xij}$, (i.e., all capacitor voltages) consist of stable cell equilibrium states.

It is important in the following analysis to remember that whereas all stable system equilibrium points are made up of stable cell equilibrium states, the converse is not true, as some combinations of stable cell equilibrium points may not correspond to actual equilibrium points of the overall circuit. If we denote the corresponding set $S_o^*$ of observable equilibrium output vectors, then we have $S_o^* | S_o : S$.

Now, let us compute the stable cell equilibrium states of an inner cell of the preceding circuit example. Considering the condition in the above definitions, the stable cell equilibrium states can be obtained by solving equation (38a) for $V_{xij}$ with $V_{yij}$ taking on either the value $+1$ or $-1$:

$$V_{xij} = sgn[V_{yij-1}] + 2sgn[V_{yij}] + sgn[V_{yij+1}] \quad (41a)$$

$$|V_{xij}| \leq 1, 1 \leq i \leq M; 1 \leq j \leq N. \quad (41b)$$

Substituting $V_{yij-1}$ and $V_{yij+1}$ in the above equations by $\pm 1$, and considering that sgn $[V_{yij}] = sgn[V_{xij}]$ from equation (38b), we obtain the following four cases:

(a) For $v_{yij-1} = -1$ and $v_{yij+1} = -1$, we have $v_{xij} = -2 + 2sgn[v_{xij}]$, and hence $v_{xij} = -4$.

(b) For $v_{yij-1} = +1$ and $v_{yij+1} = -1$, we have $v_{xij} = 2sgn[v_{xij}]$, and hence $v_{xij} = -2$, or 2.

(c) For $v_{yij-1} = -1$ and $v_{yij+1} = +1$, we have $v_{xij} = 2sgn[v_{xij}]$, and hence $v_{xij} = -2$, or 2.

-continued (d) For $v_{yij-1} = 1$ and $v_{yij+1} = 1$, we have $v_{xij} = 2 + 2sgn[v_{xij}]$, and hence $v_{xij} = 4$.

It follows from the above analysis that the stable cell equilibrium states of any inner cell circuit for our present example are $-4, -2, 2,$ and $4$.

It is obvious that the stable cell equilibrium state of each cell depends on the stable cell equilibrium states of its neighbor cells. Of course, if the input of the cellular neural network is not zero, then the stable cell equilibrium states of a cell circuit will also depend on the input, $V_u$. Therefore, the stable system equilibrium points of a cellular neural network by Definition 3 depend on the initial conditions, the inputs, and the dynamic rule of the circuit. Any stable system equilibrium point can be considered as a two-dimensional pattern. For a given cellular neural network, like the one in this example, there are only a finite number of discrete patterns. The continuous image space, $[-1,1]^{M \times N}$, therefore, is transformed into a finite number of discrete patterns by a cellular neural network. The properties of the patterns can be determined by those of the stable cell equilibrium states. Consequently, the output voltage $V_y$ must possess some structural features for a specific cellular neural network. For example, if $V_{yij-1}=1$, and $V_{yij-1}-1$ as prescribed by the above case (d), then $V_{yij}=1$ is the only choice.

As noted above, the image transform by a cellular neural network is a dynamical transform. So, it is important to consider the transient response of a cellular neural network. The transient response of a cellular neural network is simply the trajectory from the initial state to the steady state of the system. It is well known from the theory of differential equations that any stable system equilibrium point, as defined in Definition 3, of a cellular neural network is a limit point of a set of trajectories of the corresponding differential equations (1). Such an attracting limit point has a basin of attraction which consists of the union of all trajectories tending to this limit point. The state space of the system is partitioned into a set of basins centered at the stable system equilibrium points. Then the map, F, as defined in equation (36), can be characterized by the basins and, hence, by the transient response. Since it is extremely difficult if not impossible to analyze the transient behavior of such a complex nonlinear dynamical system, a computer simulation method has been used to study the transient behaviors of cellular neural networks in the following examples.

Summarizing the above observations from this example, (a) Any input image represented in analog form can be mapped into a specific output image with binary values by a cellular neural network, (b) For a given cellular neural network, the output images are imbued with some spatial structures resulting from the dynamic rule of the circuit. for instance, it is impossible to have a row like $[1,-1,1,-1]$, which is a rejected pattern, in the output image of the cellular neural network in the above example. Hence, an appropriately chosen dynamic rule could imbue a cellular neural network with the ability to recognize and extract some special patterns from input images.

(c) Different input images may be mapped into the same output image if they have the same patterns, and the same input image may be mapped into different output images by different cellular neural networks for different image processing or pattern recognition purposes.

The indexes of nodes are coded as follows: The first number from the left specifies the type of the nodes in a cell, 1 for the state voltage node, 2 for the output voltage node; the second number from the left specifies the layer number; the third and fourth numbers specify the rows; and the fifth and sixth numbers specify the columns. For example, v(110102) means $V_{x12}$, and V(210104) means $V_{y14}$, and so on.

Multiplexing is one of the various ways to input data to and extract data from the individual cells of a CNN. FIG. 13 shows a simplified 4×4 CNN that consists of individual CNN cells 140-x where x ranges from 1 to 16. Each CNN cell has connected to it a corresponding individual data switch 142-x where x is the same as for the individual cells. Each of switches 142-x are controlled in groups of four by control lines 146-y where y ranges from 1 to 4 to effectively correspond with the columns of CNN cells in the array. Each of switches 142-x are also connected in groups of four to data lines 144-z where z ranges from 1 to 4 to effectively correspond with the rows of CNN cells in the array. In this configuration, an analog input voltage is applied to each of the data lines 144-z and one of the control lines 146-y is selected to apply those signals to the CNN cells in a particular row of CNN cells. Thus, each column is loaded sequentially with each cell in that column loaded in parallel. This data transfer technique could be performed in any order that one may desire.

By allowing the control signal to have three levels, the data lines 144-z can serve as both data input and output lines. Another possibility is to have each data line consist of two wires which would permit four distinct states for the two control lines. One state could be input, another output, and a third disconnect. A disconnect state is useful since it may be necessary to disconnect the CNN cells from the data signal lines as it settles to the steady state. If the disconnect option were not provided, it might take longer for the CNN array to settle to a steady state or it might require greater power consumption. Multiplexing also allows interfacing to a large CNN array with fewer terminals than would be required if an individual data line were provided for each cell of the CNN array. Additionally, multiplexing is especially useful when the data to be input into the CNN array is supplied by a computer via a high-speed D/A converter or from a remote sensor.

Referring next to FIG. 14 there is shown a simplified 4×4 CNN that consists of individual CNN cells 148-x where x ranges from 1 to 16. Each CNN cell has connected to it a corresponding individual optical sensor 150-x where x is the same as for the individual CNN cells. Each of the optical sensors can be used to optically detect a portion of an image that represents the input data to the corresponding CNN cell. In this configuration, the data or image to be processed would be projected directly onto the CNN chip through a transparent window in the chip package. Each cell of the CNN would then receive its input signal in parallel with each of the others at a very high speed. This configuration could be used where the CNN is being used for pattern recognition with each cell of the CNN dedicated to process a single pixel of the input image. Thus, the template of the CNN would be designed to identify a particular image, and if all of the pixels (or a selected percentage of the pixels) of an applied image agree with the template element in each cell of the CNN, the applied image is identified as that for which the CNN array was programmed to recognize. This configuration therefore allows a CNN processor to act on the input image as it comes directly from a real-world image.

The output signals from the CNN array can be handled in many different ways including direct output from each cell or through multiplexing. In addition, either of those techniques could be implemented electronically or optically. An optical input/output technique would lend itself to extremely high speed applications, particularly in an image identification or enhancement application. In this configuration, the optical sensor/transmitter would produce photoelectrons when exposed to light in the input mode, and radiate a light having an intensity that is proportional to the output voltage of the CNN cell in the output mode.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A cellular neural network comprising:
   a plurality of identical analog cells arranged in a multi-dimensional lattice array of said plurality of cells, the cells closest to any single cell in each of the multiple dimensions being neighbor cells that form a first layer of neighbor cells that are interconnected with said any single cell in the same way depending on their relative position as a neighbor cell to said any single cell, all of the cells separated from any single cell by one other cell in any of the multiple dimensions form a second layer of neighbor cells that are interconnected with said any single cell in the same way depending on their relative position as a neighbor cell to said any single cell, and the layers of neighbor cells expanding concentrically from said second layer of neighbor cells in the multiple dimensions around said any single cell forming additional layers of neighbor cells to the full extent of said lattice array that are interconnected with said any single cell in the same way depending on their relative position as a neighbor cell to said any single cell,
   each of said cells interacting non-linearly and continuously in time with selected layers of said neighbor cells and at least said first layer of each of said cell's nearest neighbor cells with independently selected parameters for each of cell of said layers depending on the relative position of each cell in said layer to said any single cell,
   wherein each cell includes:
   non-linear feed-forward means coupled to each cell in the selected layers of said each cell's neighbor cells for influencing the state of each cell in said selected layers of neighbor cells,
   non-linear feedback means coupled to each cell in the selected layers of each cell's neighbor cells for influencing the state of each cell in said selected layers of said neighbor cells, and
   non-linear self feedback means for influencing the state of itself.

2. The cellular neural network of claim 1 wherein said array of cells is an n-dimensional array wherein n is an integer number of at least 2.

3. The cellular neural network of claim 2 wherein n equals 2 with the array of cells having i rows and j columns, i and j being independent integers of at least 2.

4. The cellular neural network of claim 1 wherein there are m levels of neighbors wherein m is an integer number of at least 1.

5. The cellular neural network of claim 1 wherein said feed-forward means of each cell is controlled by an independent signal source.

6. The cellular neural network of claim 1 wherein said feedback and self feedback means of each cell are each controlled by the state of its cell.

7. The cellular neural network of claim 1 wherein:
   said feed forward means of each of said any single cell includes multiple output voltage controlled current source means for generating fixed feed forward signals to the cells in each layer of neighbor cells depending on relative position of the neighbor cell to said any single cell, and
   said feedback and self feedback means of each of said any single cell includes multiple output voltage controlled current source means for generating fixed feedback signals to the cells in each layer of neighbor cells depending on relative position of the neighbor cell to said any single cell and the same self feedback signal to said any single cell.

8. The cellular neural network of claim 1 wherein each cell interacts with a selected number of contiguous layers of the cell's nearest neighbor cells.

9. A pattern recognition system comprising:
   a plurality of cellular neural networks each functioning concurrently with each other to substantially simultaneously identify a different particular portion of the pattern of interest and to signal if that portion of the pattern was detected from an input signal that is simultaneously applied to each of said plurality of cellular neural networks, and
   decision means coupled to receive said signal from each of said plurality of cellular neural networks for determining if each element of the pattern of interest is present,
   each of said cellular neural networks includes:
   a plurality of identical analog cells arranged in a multi-dimensional lattice array of said plurality of cells, the cells closest to any single cell in each of the multiple dimensions being neighbor cells that form a first layer of neighbor cells that are interconnected with said any single cell in the same way depending on their relative position as a neighbor cell to said any single cell, all of the cells separated from any single cell by one other cell in any of the multiple dimensions form a second layer of neighbor cells that are interconnected with said any single cell in the same way depending on their relative position as a neighbor cell to said any single cell, and the layers of neighbor cells expanding concentrically from said second layer of neighbor cells in the multiple dimensions around said any single cell forming additional layers of neighbor cells to the full extent of said lattice array that are interconnected with said any single cell in the same way depending on their relative position as a neighbor cell to said any single cell,
   each of said cells interacting non-linearly and continuously in time with selected layers of said neighbor cells and at least said first layer of each of said cell's nearest neighbor cells with independently selected parameters for each of cell of said layers depending on the relative position of each cell in said layer to said any single cell, wherein each cell includes:

non-linear feed-forward means coupled to each cell in the selected layers of said each cell's neighbor cells of influencing the state of each cell in said selected layers of neighbor cells, non-linear feedback means coupled to each cell in the selected layers of each cell's neighbor cells for influencing the state of each cell in said selected layers of said neighbor cells, and non-linear self feedback means for influencing the state of itself.

10. The pattern recognition system of claim 9 wherein each cell interacts with a selected number of contiguous layers of the cell's nearest neighbor cells.

11. The pattern recognition system of claim 9 wherein said feed-forward means of each cell is controlled by an independent signal source.

12. The pattern recognition system of claim 9 wherein said feedback and self feedback means of each cell are each controlled by the state of its cell.

13. The pattern recognition system of claim 9 wherein:

said feed forward means of each of said any single cell includes multiple output voltage controlled current source means for generating fixed feed forward signals to the cells in each layer of neighbor cells depending on relative position of the neighbor cell to said any single cell, and said feedback and self feedback means of each of said any single cell includes multiple output voltage controlled current source means for generating fixed feedback signals to the cells in each layer of neighbor cells depending on relative position of the neighbor cell to said any single cell and the same self feedback signal to said any single cell.

14. The pattern recognition system of claim 9 wherein each cell within each of the cellular neural networks is disposed to receive a corresponding single pixel of a display that is the subject of the desired pattern recognition.

15. The pattern recognition system of claim 14 further includes a plurality of optical detector means with one such means connected to each cell of each cellular neural network for being optically exposed to the corresponding pixel of the subject pattern recognition display for entry of that pixel into the cell.

16. The pattern recognition system of claim 9 further including multiplex means coupled to each cell in each cellular neural network for entry of the input signal into the cells consecutively a row or column at a time to minimize the number of external terminals required by the system.

17. The pattern recognition system of claim 7 further including multiplex means coupled to each cell in each cellular neural network for extraction of the output signal from the cells consecutively a row or column at a time to minimize the number of external terminals required by the system.

18. The pattern recognition system of claim 9 further including multiplex means coupled to each cell in each cellular neural network for entry of the input signal into the cells consecutively a row or column at a time prior to the processing of the information, for extraction of the output signal from the cells consecutively a row or column at a time after the processing of the signal, and for minimizing of the number of external terminals required by the system.

* * * * *